United States Patent
Motoyama et al.

(10) Patent No.: US 6,699,532 B2
(45) Date of Patent: Mar. 2, 2004

(54) OPTICALLY ACTIVE COMPOUND AND LIQUID CRYSTAL COMPOSITION CONTAINING THE COMPOUND

(75) Inventors: Yuki Motoyama, Katsushika-ku (JP); Masahiro Johno, Katsushika-ku (JP)

(73) Assignee: Mitsubishi Gas Chemical Company, Inc., Tokyo (JP)

(*) Notice: Subject to any disclaimer, the term of this patent is extended or adjusted under 35 U.S.C. 154(b) by 0 days.

(21) Appl. No.: 10/461,462

(22) Filed: Jun. 16, 2003

(65) Prior Publication Data

US 2004/0007691 A1 Jan. 15, 2004

(30) Foreign Application Priority Data

Jun. 25, 2002 (JP) ........................................ 2002-184273

(51) Int. Cl.$^7$ ..................... C09K 19/58; C07C 69/76; C07C 69/78
(52) U.S. Cl. ................. 428/1.1; 252/299.2; 252/299.5; 560/56; 560/80; 560/100
(58) Field of Search ...................... 428/1.1; 252/299.2, 252/299.62, 299.5; 560/56, 80, 100; 544/298, 335; 549/369

(56) References Cited

U.S. PATENT DOCUMENTS

| | | | |
|---|---|---|---|
| 4,826,620 A | 5/1989 | Heppke et al. | ......... 252/299.61 |
| 4,988,458 A | * 1/1991 | Heppke et al. | ......... 252/299.63 |
| 5,093,027 A | 3/1992 | Kelly et al. | ............ 252/299.63 |
| 6,217,792 B1 | 4/2001 | Parri et al. | ............... 252/299.6 |

FOREIGN PATENT DOCUMENTS

| | | |
|---|---|---|
| EP | 1 225 212 | 7/2002 |
| GB | 2 298 202 | 8/1996 |
| JP | 62-081354 | 4/1987 |
| JP | 2002-212145 | 7/2002 |
| WO | 00/39631 | 7/2000 |
| WO | 00/63154 | 10/2000 |
| WO | 02/06195 | 1/2002 |

OTHER PUBLICATIONS

Kelly et al., S.M., *Four–Unit Linking Groups V. Optically Active Dopants*; Liquid Crystals, 11(5), (1992), pp. 761–771.

Deussen et al., H, *New 6,–6–Disubstituted–Binaphthol Derivatives as Chiral Dopants: Synthesis and Temperature Dependence of Molecular Conformations*; Liquid Crystals, 21(3), (1996), pp. 327–340.

* cited by examiner

*Primary Examiner*—Shean Chiu Wu
(74) *Attorney, Agent, or Firm*—Wenderoth, Lind & Ponack, LLP

(57) ABSTRACT

An optically active compound of the general formula (1) useful as a chiral dopant, and use thereof for a liquid crystal composition,

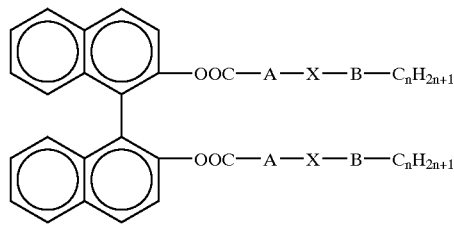

(1)

the above optically active compound having a remarkably large helical twisting power (HTP) of as large as 50 or more and having a property that the helical pitch induced decreases in length with an increase in temperature, so that the optically active compound has an excellent value as a chiral dopant for a nematic liquid crystal.

12 Claims, 2 Drawing Sheets

OPTICALLY ACTIVE COMPOUND AND LIQUID CRYSTAL COMPOSITION CONTAINING THE COMPOUND

DETAILED DESCRIPTION OF THE INVENTION

1. Field of the Invention

The present invention relates to a novel optically active compound useful as a chiral dopant, a liquid crystal composition containing the compound, and a liquid crystal display device to which the liquid crystal composition is applied. More specifically, it relates to a chiral dopant having a helical twisting power (HTP) of at least 50 and having the property of its induced helical pitch decreasing in length with an increase in temperature, and a use thereof.

2. Prior Art

Various modes are known as display modes of liquid crystal display devices, and in most of such display modes, it is required to control the helical pitch of a liquid crystal. The mode that requires the control of the helical pitch of a liquid crystal includes the following modes.

The modes that have been practically and widely used are a twisted nematic mode (TN mode) and a super twisted nematic mode (STN mode) both using a nematic liquid crystal.

In the TN mode, liquid crystal molecules are aligned so as to twist 90 degrees between an upper substrate and a lower substrate, and a ¼ pitch of a helix is formed in a cell.

In the STN mode, liquid crystal molecules are aligned so as to twist approximately 220 degrees between an upper substrate and a lower substrate, and an approximately ⅗ pitch of a helix is formed in a cell.

The TN mode is employed in a simple matrix driving liquid crystal display device and an active matrix driving liquid crystal display device, and the STN mode is employed in a simple matrix driving liquid crystal display device.

Figure 1:
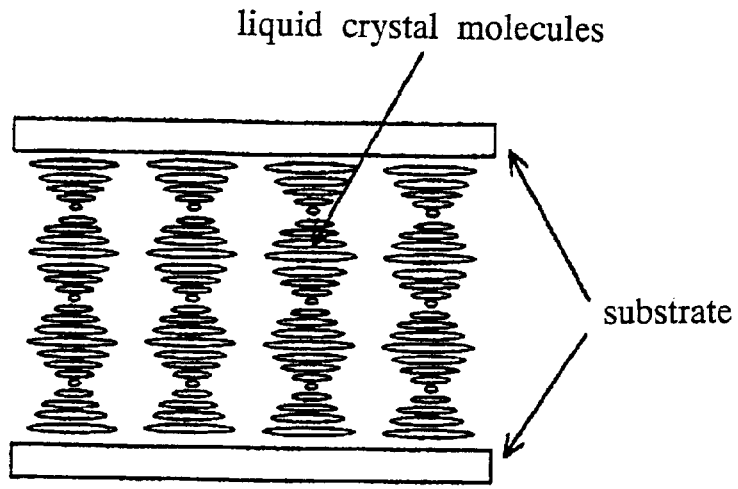
FIG. 1 is a schematic drawing showing a planar alignment state of a chiral nematic liquid crystal.
Figure 2:
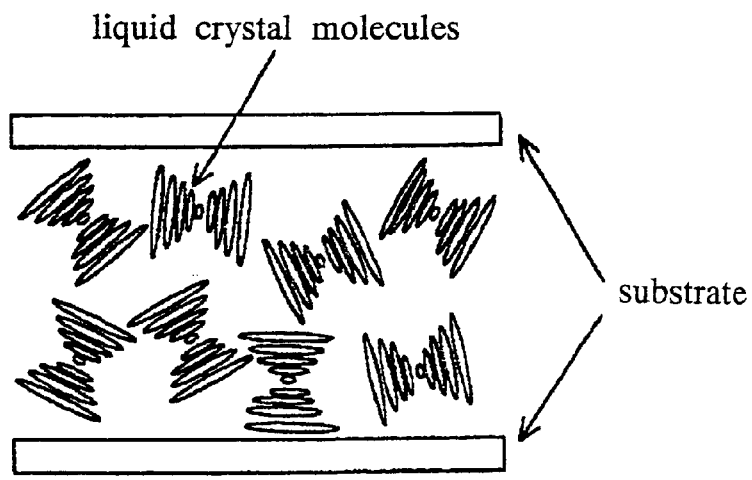
FIG. 2 is a schematic drawing showing a focal-conic alignment state of a chiral nematic liquid crystal.

Further, there is also a selective reflection (SR) mode of a chiral nematic liquid crystal as another mode in addition to the above TN mode and STN mode. In the SR mode, as shown in FIGS. 1 and 2, a liquid crystal has a planar alignment state in which helical axes are perpendicular to substrates (FIG. 1) and a focal-conic alignment state in which directions of helical axes are at random (FIG. 2). These two states are switched from one to the other with voltage pulse. In the planar alignment state, light having a wavelength corresponding to a helical pitch is reflected, and in the focal-conic alignment state, light is transmitted through a device. When a reflection state is used as "bright" and when a transmission state is used as "dark", a display can be materialized.

An optically active compound that induces a helical structure is generally called "chiral dopant". Many chiral dopants have been synthesized, and typical compounds thereof are compounds having the following structures.

| Name | Structural formula |
|---|---|
| S811; | $C_6H_{13}O$—⟨phenyl⟩—COO—⟨phenyl⟩—$COOC^*HC_6H_{13}$ with $CH_3$ |
| CB15; | $NC$—⟨biphenyl⟩—$CH_2C^*HC_2H_5$ with $CH_3$ |
| CN; | cholesteryl $C_8H_{17}COO$— |

The most essential performance that is required of a chiral dopant compound is to have large helical twisting power. The helical twisting power (HTP) refers to a physical quantity defined by the following expression.

HTP ($\mu m^{-1}$)=1/(amount of chiral dopant added (wt %)/100×induced helical pitch ($\mu m$))

Generally, chiral dopants themselves exhibit no liquid crystallinity, and most of them have large molecular weights. When a large amount of a chiral dopant is added to a base liquid crystal, it degrades various performances in many cases. The degradation of the performances includes a decrease in temperature for phase transition from an isotropic phase to a nematic phase, an increase in viscosity of a liquid crystal and an easy occurrence of crystallization. A chiral dopant having large helical twisting power serves to prevent the degradation of the various performances, since a desired helical pitch can be obtained by adding a small amount of such a chiral dopant to the base liquid crystal.

A helical pitch has the property of easily undergoing a change depending upon temperatures. Since a change in helical pitch has influences on various performances, it is desirable that a change in helical pitch depending upon temperature should be as small as possible in all of the display modes as described above.

In the SR mode in particular, a liquid crystal reflects (selectively reflects) light corresponding to a helical pitch to generate a bright state. However, when chiral dopants that have been already developed are used, the helical pitch increases in length with an increase in temperature, so that there is caused a critical problem that reflected light changes in color.

A change in wavelength of selectively reflected light with an increase in temperature will be referred to as "wavelength shift".

An increase in wavelength of selectively reflected light caused by an increase in temperature is defined to be plus wavelength shift, and a decrease in wavelength of selectively reflected light is defined to be minus wavelength shift.

For removing the dependency of wavelength of selectively reflected light upon temperatures, it has been attempted to combine a chiral dopant that shows a plus wavelength shift and a chiral dopant that shows a minus wavelength shift. However, there are very few chiral dopants that show a minus wavelength shift, and there is reported only one compound that is described in U.S. Pat. No. 6,217,792 as a compound having an HTP of 50 or more, that is, a compound containing an isosorbide as an asymmetric source and having —OOC—Ph—OOC—Ph—OCH$_3$ (—Ph— is a 1,4-phenylene group) substituted on two —OH group portions thereof by ester-bonding. Further, those compounds that have been so far disclosed are not satisfactory, since these compounds have a problem that they are liable to cause crystallization even when added in a small amount.

In the present specification, a "liquid crystal" means a composition containing a plurality of liquid crystal compounds unless it is specified to be a specific compound. Further, a "chiral dopant" means an optical active compound that induces a helical structure or a mixture of such compounds. Further, a "basic liquid crystal" means a nematic liquid crystal containing no chiral dopant.

PROBLEMS TO BE SOLVED BY THE INVENTION

It is an object of the present invention to provide a chiral dopant having a remarkably large HTP of as large as 50 or more and having a property that the pitch of a helix to be induced decreases in length with an increase in temperature.

The present inventors have developed novel chiral dopants that exhibit a minus wavelength shift, and have proposed some of them (for example, JP-A-2002-212145).

According to the studies so far made, first, it has been found that a structure of an optically active portion has a great influence on whether optically active compound exhibits a minus or plus wavelength shift, and it has been further found that a specific skeleton bonding thereto easily causes a minus wavelength shift. However, those compounds that have been so far found have an HTP of 40 or less, and even if such a compound is combined with a chiral dopant having a plus wavelength shift and having a large HTP, no satisfactory HTP has been attainable.

JP-A-62-81354 to Heppke et al discloses nine chiral dopant compounds containing 1,1'-bi-2-naphthol as an optically active portion, and of these compounds, five compounds exhibit large HTP values. As is clear in FIG. 1 of Japanese Laid-open Patent Publication to Heppke et al, three compounds exhibit a plus wavelength shift. Further, as is clear in FIG. 3 of the Japanese Laid-open Patent Publication, the remaining two compounds exhibit specific behavior in such a manner that their helical pitches once decrease with an increase in temperature and then increase in length with a further increase in temperature. Concerning the chiral dopant compounds containing 1,1'-bi-2-naphthol as an optically active portion, there is reported no compound that exhibits a minus wavelength shift.

The structural formula of the compound (HPBNP) described in Example 1 of Japanese Laid-open Patent Publication to Heppke et al corresponds to a structural formula of the compound of the following general formula (1) provided by the present invention in which A is —Ph—, X is —OOC—, B is —Ph—O— and n is 6.

HPBNP was synthesized and measured for physical property values. As a result, it showed an HTP of 73 and a wavelength shift of +20 nm, and it was accordingly possible to reproduce the results shown in FIG. 1 of the above Japanese Laid-open Patent Publication to Heppke et al.

That is, it has been found that the compounds containing 1,1'-bi-2-naphthol as an optically active portion can exhibit remarkably large HTP values.

Means to Solve the Problems

Therefore, the present inventors have attempted to overcome the above problems by introducing a specific skeleton that easily exhibits a minus wavelength shift into an optical active portion that exhibits a large HTP, that is, 1,1'-bi-2-naphthol, and as a result, the present invention has been completed.

According to the present invention, therefore, there is provided an optically active compound of the following general formula (1).

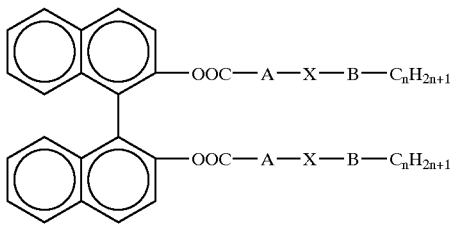
(1)

wherein n is an integer of 1 to 10, A is —Ph—, —Ph(F)—, —Ph—Ph— or —Np—, X is —OOC— or —OCH$_2$—, and B is one of the groups defined below.

(1) When A is —Ph— or —Ph(F)— and when X is —OOC—, B is —Ph—Ph—Y—, —Cy—Ph—Y—, —Ph—Cy—, —Cy—Cy—, —Ph—Di—, —Np—Y—, —Py(R)—Ph—Y—, —Ph—Py(L)—Y—, —Ph—OOC—Ph—Y— or —Ph—OOC—Cy—, (2) when A is —Ph— or —Ph(F)— and when X is —OCH$_2$—, B is —Ph—Ph—Y—, —Ph—Cy—, —Ph—Di—, —Np—Y—, —Py(R)—Ph—Y— or —Ph—Py(L)—Y—, (3) when A is —Ph—Ph— or —Np— and when X is —OOC—, B is —Ph—Y— or —Cy—, and (4) when A is —Ph—Ph— or —Np— and when X is —OCH$_2$—, B is —Ph—Y—, in which —Ph—, —Ph(F)—, —Cy—, —Di—, —Py(L)—, —Py(R)— and —Np— show the following structures, and Y is a single bond or an oxygen atom.

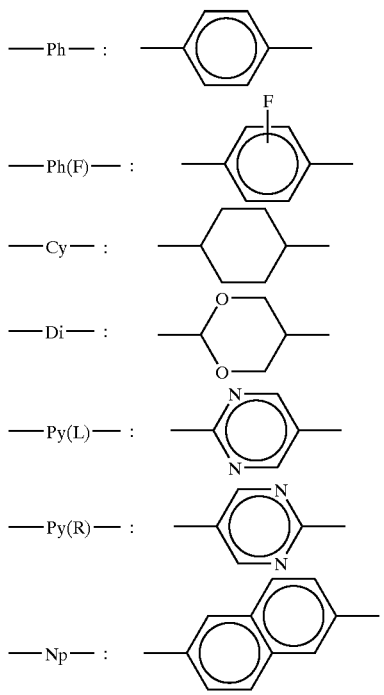

In the optically active compound of the present invention, preferred is a compound of the general formula (1) in which n is an integer of 3 to 8, a compound of the general formula (1) in which A is —Ph— or —Ph—Ph— or a compound of the general formula (1) in which X is —OOC—. Further, particularly preferred is a compound of the general formula (1) in which A is —Ph— or —Ph—Ph— and X is —COO—. Further, desirably, the optically active compound of the present invention has a helical twisting power (HTP) of 50 or more and a property that the helical pitch induced decreases with an increase in temperature. The optically active compound of the present invention is suitably used as a chiral dopant for a nematic liquid crystal, is suitably used in the form of a nematic liquid crystal composition containing at least one optically active compound of the general formula (1) and is advantageously used in a liquid crystal display device having the nematic liquid crystal composition interposed between substrates having electrodes.

The optically active compound of the present invention includes an R-configuration compound and an S-configuration compound, and any one of these can be suitably used. That is, the R-configuration compound and the S-configuration compound differ from each other in twisting direction (right-handed twisting or left-handed twisting) of the helical structure induced. These compounds are therefore selected by taking account of the twisting direction of a chiral dopant to be used in combination.

The optically active compound of the present invention has excellent compatibility with a nematic liquid crystal as a base liquid crystal and does not easily cause crystallization. However, when a large amount of the optically active compound of the present invention is solely added to a nematic liquid crystal, the resultant composition having some combination may undergo crystallization at room temperature. In this case, however, the crystallization can be easily avoided by using other chiral dopant in combination.

When the optically active compound of the present invention is used as a chiral dopant, the amount of the optically active compound based on the nematic liquid crystal to which the optically active compound is added is generally in the range of 0.1 to 20% by weight, preferably 0.1 to 10% by weight. The above amount ratio is preferably determined to be in the above range on the basis of values of helical twisting power (HTP) and crystallinity of the optically active compound and a type of a nematic liquid crystal.

EFFECT OF THE INVENTION

The present invention provides a chiral dopant having a remarkably large HTP of as large as 50 or more and having a property that the helical pitch induced decreases in length with an increase in temperature.

In liquid crystals for use in TN mode or STN mode, therefore, the helical pitch can be adjusted by only adding a small amount of the chiral dopant of the present invention, so that the degradation of performances of a base liquid crystal can be suppressed. In a liquid crystal operated in SR mode, a chiral dopant that induces a plus wavelength shift and the optically active compound of the present invention are used in combination, whereby there can be obtained a liquid crystal free of a change that occurs in helical pitch depending upon temperatures.

EXAMPLES

The present invention will be specifically explained with reference to Examples and Comparative Examples hereinafter, while the present invention shall not be limited to these.

Example 1

(Formula (1): A=—Ph—, X=—OOC—, B=—Ph—Cy—, n=4 (E1)), Preparation of [(R)-(+)-1,1'-bi-2-naphthalene]-2,2'-diylbis(oxycarbonyl-4,1-phenylene)4-(trans-4-n-butylcyclohexyl)benzoate (1) Synthesis of [(R)-(+)-1,1'-bi-2-naphthalene]-2,2'-diyl 4-acetoxybenzoate An eggplant type flask was charged with 10.9 g (0.038 mol) of (R)-(+)-1,1'-bi-2-naphthol and 24.7 g (0.114 mol) of 4-acetoxybenzoyl chloride, and these were dissolved in 300 mL (milliliters) of dichloromethane. To the solution was added 10.0 g (0.126 mol) of pyridine, and the mixture was stirred 1 day at room temperature. To the reaction mixture was added 100 mL of water, and the mixture was stirred for 30 minutes. Then, 2N hydrochloric acid was added to separate the mixture to an organic layer and an aqueous layer. The organic layer was washed with water and dried over anhydrous magnesium sulfate. The solvent was distilled off under reduced pressure, to give 22.5 g (0.037 mol) of an end compound.

(2) Synthesis of [(R)-(+)-1,1'-bi-2-naphthalene]-2,2'-diyl 4-hydroxybenzoate 22.5 g (0.037 mol) of [(R)-(+)-1,1'-bi-2-naphthalene]-2,2'-diyl 4-acetoxybenzoate was placed in an eggplant type flask and dissolved in 100 mL of toluene. 11.5 g (0.148 mol) of a methylamine 40 wt % methanol solution was dropwise added thereto, and the mixture was stirred at room temperature for 5 hours. 2N hydrochloric acid was added to the reaction solution to separate it into an organic layer and an aqueous layer. The organic layer was washed with water and dried over anhydrous magnesium sulfate, and then the solvent was distilled of under reduced pressure, to give 17.1 g (yield 86%) of an end compound.

(3) Synthesis of [(R)-(+)-1,1'-bi-2-naphthalene]-2,2'-diylbis(oxycarbonyl-4,1-phenylene) 4-(trans-4-n-butylcyclohexyl)benzoate An eggplant type flask was charged with 0.78 g (0.0015 mol) of [(R)-(+)-1,1'-bi-2-naphthalene]-2,2'-diyl 4-hydroxybenzoate and 0.77 g (0.003 mol) of 4-(trans-n-butylcyclohexyl)benzoic acid, and these components were dissolved in 40 mL of dichloromethane. 0.72 g (0.0035 mol) of dicyclohexylcarbodiimide (DCC) and 0.14 g (0.0011 mol) of dimethylaminopyridine (DMAP) were added, and the mixture was stirred at room temperature for 1 day. A precipitated solid was separated by filtration, and an organic layer was washed with 2N hydrochloric acid and with water, and dried over anhydrous magnesium sulfate. Then, the solvent was distilled off under reduced pressure, to give a crude product.

The thus-obtained crude product was purified by high-performance liquid column chromatography, to give 1.12 g (yield 75%) of an end compound.

Examples 2 to 5

(Formula (1): A=—Ph—, X=—OOC—, B=—Ph—Cy—, n=3 (E2)), Preparation of [(R)-(+)-1,1'-bi-2-naphthalene]-2,2'-diylbis(oxycarbonyl-4,1-phenylene) 4-(trans-4-n-propylcyclohexyl)benzoate (Formula (1): A=—Ph—, X=—OOC—, B=—Ph—Cy—, n=6 (E3)), Preparation of [(R)-(+)-1,1'-bi-2-naphthalene]-2,2'-diylbis(oxycarbonyl-4,1-phenylene) 4-(trans-4-n-hexylcyclohexyl)benzoate (Formula (1): A=—Ph—, X=—OOC—, B=—Ph—Cy—, n=7 (E4)), Preparation of [(R)-(+)-1,1'-bi-2-naphthalene]-2,2'-diylbis(oxycarbonyl-4,1-phenylene) 4-(trans-4-n-heptylcyclohexyl)benzoate (Formula (1): A=—Ph—, X=—OOC—, B=—Cy—Cy—, n=3 (E5)), Preparation of [(R)-(+)-1,1'-bi-2-naphthalene]-2,2'-diylbis(oxycarbonyl-4,1-phenylene) 4-(trans-4-n-propylcyclohexyl)cyclohexane carboxylate End compounds were obtained in the same manner as in Example 1 except that 4-(trans-n-butylcyclohexyl)benzoic acid in (3) of Example 1 was replaced with 4-(trans-n-propylcyclohexyl)benzoic acid,
4-(trans-n-hexylcyclohexyl)benzoic acid,
4-(trans-n-heptylcyclohexyl)benzoic acid or
4-(trans-4-n-propylcyclohexyl)trans-cyclohexane carboxylic acid, respectively.

Example 6

(Formula (1): A=—Ph(F)—, X=—OOC—, B=—Ph—Cy—, n=6 (E6)), Preparation of [(R)-(+)-1,1'-bi-2-naphthalene]-2,2'-diylbis(oxycarbonyl-3-fluoro-4,1-phenylene) 4-(trans-4-n-hexylcyclohexyl)benzoate An end compound was obtained in the same manner as in Example 1 except that 4-acetoxybenzoyl chloride in (1) of Example 1 was replaced with 4-acetoxy-2-fluorobenzoyl chloride and that 4-(trans-n-butylcyclohexyl)benzoic acid in (3) of Example 1 was replaced with 4-(trans-n-hexylcyclohexyl)benzoic acid.

Examples 7 to 12

(Formula (1): A=—Ph—, X=—OOC—, B=—Ph—Ph—, n=3 (E7)), Preparation of [(R)-(+)-1,1'-bi-2-naphthalene]-2,2'-diylbis(oxycarbonyl-4,1-phenylene) 4'-n-propylbiphenyl-4-carboxylate (Formula (1): A=—Ph—, X=—OOC—, B=—Ph—Ph—, n=4 (E8)), Preparation of [(R)-(+)-1,1'-bi-2-naphthalene]-2,2'-diylbis(oxycarbonyl-4,1-phenylene) 4'-n-butylbiphenyl-4-carboxylate (Formula (1): A=—Ph—, X=—OOC—, B=—Ph—Ph—, n=5 (E9)), Preparation of [(R)-(+)-1,1'-bi-2-naphthalene]-2,2'-diylbis(oxycarbonyl-4,1-phenylene) 4'-n-pentylbiphenyl-4-carboxylate (Formula (1): A=—Ph—, X=—OOC—, B=—Ph—Ph—, n=6 (E10)), Preparation of [(R)-(+)-1,1'-bi-2-naphthalene]-2,2'-diylbis(oxycarbonyl-4,1-phenylene) 4'-n-hexylbiphenyl-4-carboxylate (Formula (1): A=—Ph—, X=—OOC—, B=—Ph—Ph—, n=7 (E11)), Preparation of [(R)-(+)-1,1'-bi-2-naphthalene]-2,2'-diylbis(oxycarbonyl-4,1-phenylene) 4'-n-heptylbiphenyl-4-carboxylate (Formula (1): A=—Ph—, X=—OOC—, B=—Ph—Ph—O—, n=5 (E12)), Preparation of [(R)-(+)-1,1'-bi-2-naphthalene]-2,2'-diylbis(oxycarbonyl-4,1-phenylene) 4'-n-pentyoxylbiphenyl-4-carboxylate End compounds were obtained in the same manner as in Example 1 except that 4-(trans-n-butylcyclohexyl)benzoic acid in (3) of Example 1 was replaced with 4-(4'-n-propylbiphenyl)carboxylate,
4-(4'-n-butylbiphenyl)carboxylic acid,
4-(4'-n-pentylbiphenyl)carboxylic acid,
4-(4'-n-hexylbiphenyl)carboxylic acid,
4-(4'-n-heptylbiphenyl)carboxylic acid or
4-(4'-n-pentyoxylbiphenyl)carboxylic acid, respectively.

Example 13

(Formula (1): A=—Ph(F)—, X=—OOC—, B=—Ph—Ph—, n=6 (E13)), Preparation of [(R)-(+)-1,1'-bi-2-naphthalene]-2,2'-diylbis(oxycarbonyl-3-fluoro-4,1-phenylene) 4'-n-hexylbiphenyl-4-carboxylate An end compound was obtained in the same manner as in Example 1 except that 4-acetoxybenzoyl chloride in (1) of Example 1 was replaced with 4-acetoxy-2-fluorobenzoyl chloride and that 4-(trans-n-butylcyclohexyl)benzoic acid in (3) of Example 1 was replaced with 4-(4'-n-hexylbiphenyl) carboxylic acid.

Example 14

(Formula (1): A=—Ph—, X=—OOC—, B=—Ph—Di—, n=8 (E14)), Preparation of [(R)-(+)-1,1'-bi-2-naphthalene]-2,2'-diylbis(oxycarbonyl-4,1-phenylene) 4-(5-n-octyl-1,3-dioxane-2-yl)benzoate An end compound was obtained in the same manner as in Example 1 except that 4-(trans-n-butylcyclohexyl)benzoic acid in (3) of Example 1 was replaced with 4-(5-n-octyl-1,3-dioxane-2-yl)benzoic acid.

Example 15

(Formula (1): A=—Ph—, X=—OOC—, B=—Ph—Py(L)—, n=8 (E15)), Preparation of [(R)-(+)-1,1'-bi-2-naphthalene]-2,2'-diylbis(oxycarbonyl-4,1-phenylene) 4-(5-n-octylpyrimidine-2-yl)benzoate An end compound was obtained in the same manner as in Example 1 except that 4-(trans-n-butylcyclohexyl)benzoic acid in (3) of Example 1 was replaced with 4-(5-n-octylpyrimidine-2-yl)benzoate.

Example 16

(Formula (1): A=—Ph—Ph—, X=—OOC—, B=—Cy—, n=5 (E16)), Preparation of [(R)-(+)-1,1'-bi-2-naphthalene]-2,2'-diylbis(oxycarbonyl-4,4'-biphenylene) trans-4-n-pentylcyclohexanecarboxylate.

An end compound was obtained in the same manner as in Example 1 except that 4-acetoxybenzoyl chloride in (1) of Example 1 was replaced with 4'-acetoxybiphenyl-4-carbonyl chloride and that 4-(trans-n-butylcyclohexyl) benzoic acid in (3) of Example 1 was replaced with 4-n-pentylcyclohexanecarboxylic acid.

Example 17

(Formula (1): A=—Ph—Ph—, X=—OOC—, B=—Ph—, n=5 (E17)), Preparation of [(R)-(+)-1,1'-bi-2-naphthalene]-2,2'-diylbis(oxycarbonyl-4,4'-biphenylene) 4-n-pentyl benzoate An end compound was obtained in the same manner as in Example 1 except that 4-acetoxybenzoyl chloride in (1) of Example 1 was replaced with 4'-acetoxybiphenyl-4-carbonyl chloride and that 4-(trans-n-butylcyclohexyl) benzoic acid in (3) of Example 1 was replaced with 4-n-pentyl benzoic acid.

Structural formulae of the above-obtained optically active compounds (E1 to E17) are shown below. Tables 1 to 3 show $^1$H-NMR measurement results of these compounds.

Common portion (p is 0 or 1)

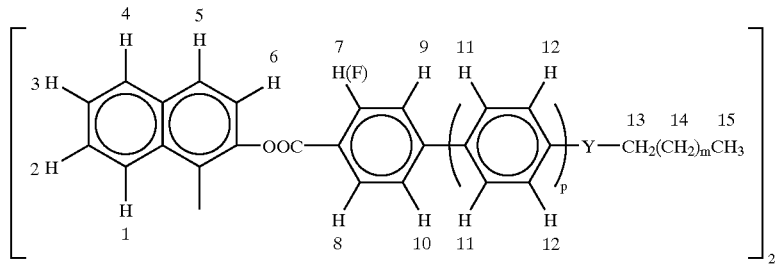

Y portion

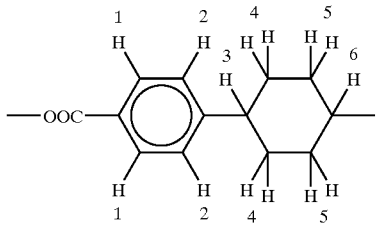

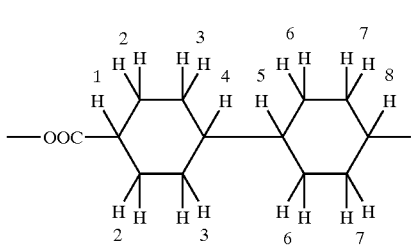

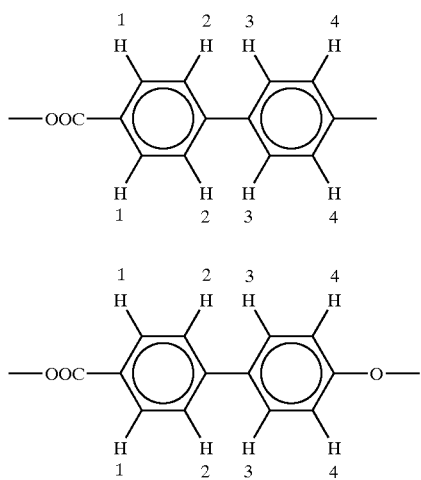
TABLE 1
| | Common portion $^1$H-NMR ($\delta$, ppm) | | | | | | | |
|---|---|---|---|---|---|---|---|---|
| Compound | 1 | 2 | 3 | 4 | 5 | 6 | 7 | 8 |
| E1 | 7.57 | |←7.32–7.48→| | | 7.99 | 7.92 | 7.32–7.48 | 8.06 | 8.06 |
| E2 | 7.57 | |←7.31–7.47→| | | 7.99 | 7.92 | 7.31–7.47 | 8.06 | 8.06 |
| E3 | 7.57 | |←7.32–7.48→| | | 8.00 | 7.92 | 7.32–7.48 | 8.06 | 8.06 |
| E4 | 7.57 | |←7.32–7.48→| | | 8.00 | 7.92 | 7.32–7.48 | 8.06 | 8.06 |
| E5 | | |←7.32–7.55→| | | 7.97 | 7.90 | 7.32–7.55 | 7.64 | 7.64 |
| E6 | | |←7.32–7.49→| | | 8.03 | 7.93 | 7.32–7.49 | — | 7.58 |
| E7 | | |←7.25–7.74→| | | 8.01 | 7.93 | 7.25–7.74 | 8.20 | 8.20 |
| E8 | | |←7.28–7.74→| | | 7.97 | 7.84 | 7.28–7.74 | 8.20 | 8.20 |
| E9 | | |←7.25–7.74→| | | 8.05 | 7.93 | 7.25–7.74 | 8.20 | 8.20 |
| E10 | | |←7.25–7.76→| | | 8.01 | 7.93 | 7.25–7.76 | 8.21 | 8.21 |
| E11 | | |←7.23–7.74→| | | 8.01 | 7.93 | 7.23–7.74 | 8.20 | 8.20 |
| E12 | | |←7.25–7.71→| | | 8.01 | 7.93 | 7.25–7.71 | 8.18 | 8.18 |
| E13 | | |←7.24–7.72→| | | 8.03 | 7.94 | 7.24–7.72 | — | 7.24–7.72 |
| E14 | | |←7.24–7.71→| | | 8.00 | 7.92 | 7.24–7.71 | 8.14 | 8.14 |
| E15 | | |←7.33–7.60→| | | 8.01 | 7.93 | 7.33–7.60 | 8.26 | 8.26 |
| E16 | | |←7.33–7.60→| | | 8.00 | 7.92 | 7.33–7.60 | 7.70 | 7.70 |
| E17 | | |←7.25–7.62→| | | 8.01 | 7.93 | 7.25–7.62 | 8.12 | 8.12 |
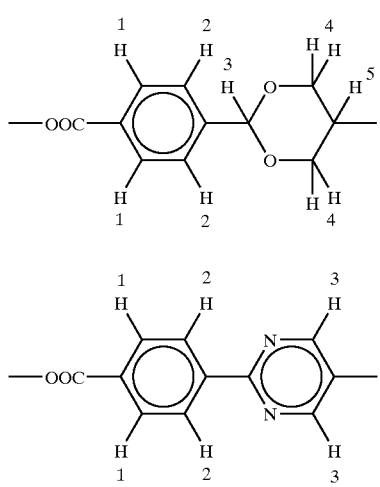
TABLE 2
| | Common portion $^1$H-NMR ($\delta$, ppm) | | | | | | |
|---|---|---|---|---|---|---|---|
| Compound | 9 | 10 | 11 | 12 | 13 | 14 | 15 |
| E1 | |←7.32–7.48→| | | — | — | |←1.02–1.60→| | | 0.91 |
| E2 | |←7.31–7.47→| | | — | — | |←1.02–1.55→| | | 0.91 |
| E3 | |←7.32–7.48→| | | — | — | |←1.02–1.56→| | | 0.90 |
| E4 | |←7.32–7.48→| | | — | — | |←1.02–1.55→| | | 0.89 |
| E5 | 6.95 | 6.95 | — | — | |←0.83–2.12→| | |
| E6 | |←7.32–7.49→| | | — | — | |←1.02–1.91→| | | 0.89 |
| E7 | |←7.25–7.74→| | | — | — | 2.65 | 1.69 | 0.99 |
| E8 | |←7.28–7.74→| | | — | — | 2.67 | 1.35–1.68 | 0.96 |
| E9 | |←7.25–7.74→| | | — | — | 2.66 | 1.34–1.70 | 0.91 |
| E10 | |←7.25–7.76→| | | — | — | 2.67 | 1.32–1.69 | 0.90 |
| E11 | |←7.23–7.74→| | | — | — | 2.66 | 1.29–1.67 | 0.89 |
| E12 | |←7.25–7.71→| | | — | — | 4.02 | 1.37–1.54 | 0.95 |
| E13 | 6.90 | 6.97 | — | — | 2.76 | 1.32–1.69 | 0.90 |
| E14 | |←7.24–7.71→| | | — | — | |←1.10–1.23→| | | 0.89 |
| E15 | 7.15 | 7.15 | — | — | 2.66 | 1.28–1.69 | 0.88 |
| E16 | |←7.33–7.60→| | | — | — | |←0.98–2.16→| | | 0.89 |
| E17 | |←7.25–7.62→| | | — | — | 2.70 | 1.26–1.70 | 0.91 |

TABLE 3

| Compound | Y portion $^1$H-NMR (δ, ppm) | | | | | | | |
|---|---|---|---|---|---|---|---|---|
| | 1 | 2 | 3 | 4 | 5 | 6 | 7 | 8 |
| E1 | 7.70 | 7.10 | 2.56 | \|←1.02–1.60→\| | — | — | — | — |
| E2 | 7.70 | 7.10 | 2.56 | \|←1.02–1.55→\| | — | — | — | — |
| E3 | 7.70 | 7.09 | 2.56 | \|←1.02–1.56→\| | — | — | — | — |
| E4 | 7.70 | 7.10 | 2.56 | \|←1.02–1.55→\| | — | — | — | — |
| E5 | 2.41 | | | \|←0.83–2.12→\| | | — | — | — |
| E6 | 8.03 | 7.32–7.49 | 2.56 | \|←1.02–1.91→\| | — | — | — | — |
| E7 | \|←7.25–7.74→\| | | 7.25–7.74 | 7.14 | — | — | — | — |
| E8 | \|←7.28–7.74→\| | | 7.28–7.74 | 7.14 | — | — | — | — |
| E9 | \|←7.25–7.74→\| | | 7.25–7.74 | 7.14 | — | — | — | — |
| E10 | \|←7.25–7.76→\| | | 7.25–7.76 | 7.15 | — | — | — | — |
| E11 | \|←7.23–7.74→\| | | 7.23–7.74 | 7.14 | — | — | — | — |
| E12 | \|←7.25–7.71→\| | | 7.14 | 7.00 | — | — | — | — |
| E13 | 8.17 | | \|←7.24–7.72→\| | | — | — | — | — |
| E14 | 7.24–7.71 | 7.12 | 5.47 | 3.56,4.26 | 2.14 | — | — | — |
| E15 | 8.56 | 7.72 | 8.68 | — | — | — | — | — |
| E16 | 2.49 | | \|←0.98–2.16→\| | | — | — | — | — |
| E17 | 7.72 | 7.25–7.62 | — | — | — | — | — | — |

Further, the above compounds (E1 to E17) were measured for thermal properties by DSC. The results were as below.
E1(65), E2(77), E3(51), E4(47), E5(68), E6(58), E7(74), E8(66), E9(59), E10(54), E11(49), E12(133: melting point), E13(56), E14(43), E15(54), E16(182: melting point), E17 (70)

Parenthesized values show melting points or glass transition temperatures, (°C.).

It was not clearly found whether the compounds E1 to E17 at room temperature were in a crystalline state or in a glass state.

Example 18

The above-synthesized optically active compounds (E1 to E17) were measured for HTPs and wavelength shifts, respectively.

To a nematic liquid crystal (ZLI-1565) supplied by Merck & Co., Inc., was added 5% by weight of the optically active compound (E1) obtained in Example 1, to prepare a chiral nematic (N*) liquid crystal composition.

The thus-prepared liquid crystal composition was measured for an upper-limit temperature of its N* phase and selective reflection behaviors, and its helical twisting power (HTP) was determined on the basis of the selective reflection behaviors. The upper-limit temperature of the N* phase was determined by observation through a polarizing microscope.

Further, the selective reflection behaviors were measured according to the following procedures.

A liquid crystal cell with ITO electrodes (cell thickness 10 μm) was charged with the above-prepared liquid crystal composition in an isotropic state. The cell was adjusted to 60° C., a rectangular wave voltage of ±60 V was applied for approximately 1 minute, and the cell was rapidly cooled to room temperature to attain planar alignment.

The above liquid crystal cell was evaluated for selective reflection behaviors at 25° C. and 60° C. with a recording spectrophotometer. HTPs at 25° C. and 60° C. were calculated on the basis of the following expressions.

$$\text{HTP} (\mu m^{-1}) = n/(\lambda_{25} \times C/100)$$

$$\text{HTP} (\mu m^{-1}) = n/(\lambda_{60} \times C/100)$$

wherein n is a refractive index of the chiral nematic liquid crystal, $\lambda_{25}$ is a selective reflection wavelength (μm) at 25° C., $\lambda_{60}$ is a selective reflection wavelength (μm) at 60° C., and C is a concentration (wt %) of the chiral dopant. As a refractive index n, there was employed a value of 1.6 that ZLI-1565 as a base liquid crystal had.

The wavelength shift was determined on the basis of the following expression.

$$\text{Wavelength shift (nm)} = \lambda_{60}{}^* - \lambda_{25}{}^*$$

wherein $\lambda_{60}{}^*$ is a selective reflection wavelength (nm) at 60° C. and $\lambda_{25}{}^*$ is a selective reflection wavelength (nm) at 25° C.

Table 4 Shows the Results

The optically active compound (E1) of Example 1 had a large HTP of 50 or more and had a property that the induced helical pitch thereof decreased in length with an increase in temperature.

Figure 3:
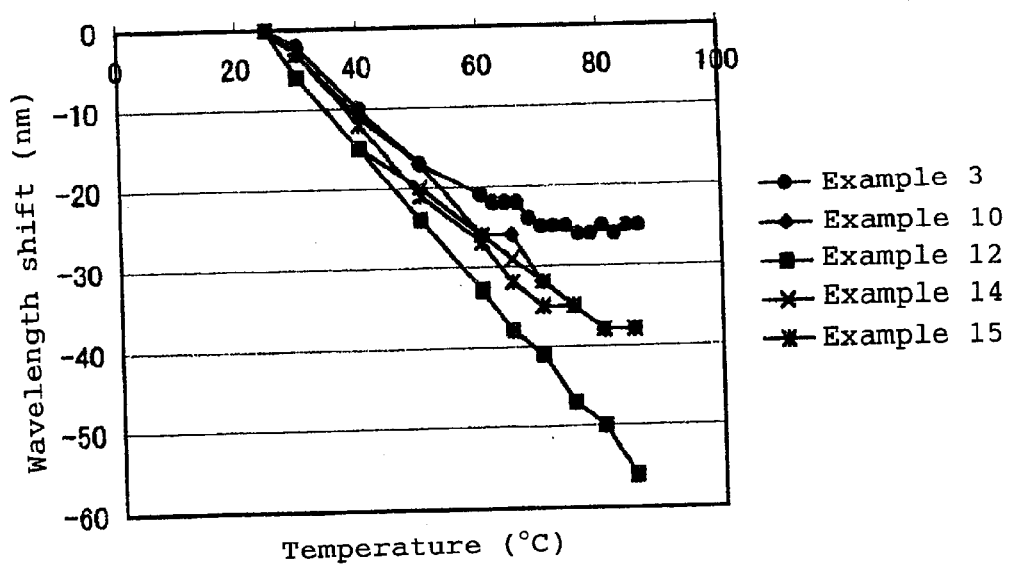
FIG. 3 is a graph showing changes in wavelength shifts of compounds of Example 3 (E3), Example 10 (E10), Example 12 (E12), Example 14 (E14) and Example 15 (E15) depending upon temperatures.

The each optically active compounds (E2 to E17) obtained in Examples 2 to 17 were measured for upper-limit temperatures of their N* phases, HTPs and wavelength shifts in the same manner as above. Table 4 shows the results. For reference purposes, FIG. 3 shows temperature-based changes in wavelength shifts of the compounds of Example 3 (E3), Example 10 (E10), Example 12 (E12), Example 14 (E14) and Example 15 (E15).

Comparative Example

Those known optically active compounds CB15, S811, CN and HPBNP explained in the description of Prior Art were measured for upper-limit temperatures of their N* phases, HTPs and wavelength shifts in the same manner as in Example 18. However, CB15 and S811 were added each in an amount of 15% by weight on the basis of the nematic liquid crystal, CN was added in an amount of 30% by weight on the same basis, and HPBNP was added in an amount of 5% by weight on the same basis. Table 4 shows the results.

Figure 4:
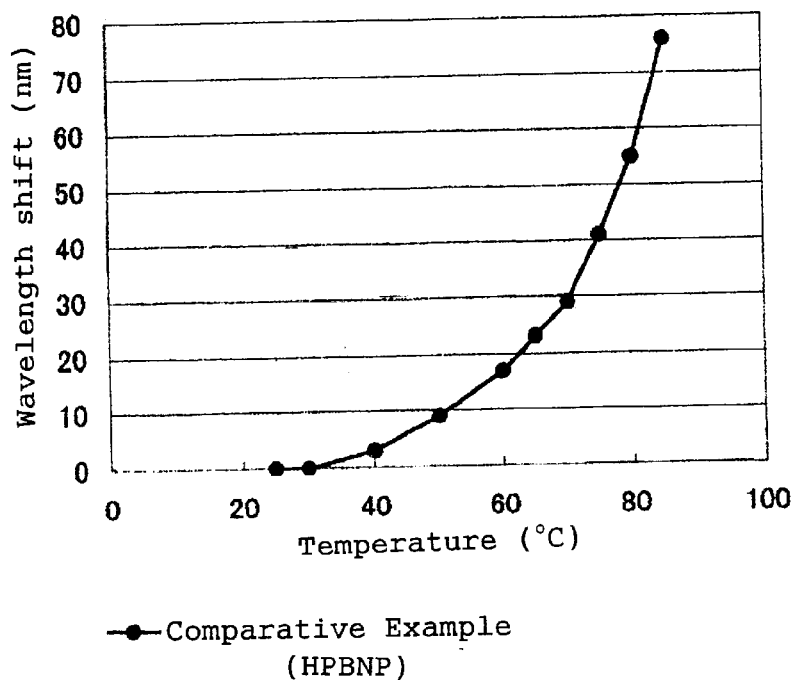
FIG. 4 is a graph showing a change in wavelength shift of a compound (HPBNP) used in Comparative Example 1 depending upon temperatures.

For comparison, FIG. 4 shows a temperature-based change in wavelength shift of the compound (HPBNP).

TABLE 4

| Compound | Iso-N*(° C.) | HTP(1/μm) | Wavelength shift(nm) |
|---|---|---|---|
| E1 | 88 | 73 | −12 |
| E2 | 87 | 74 | −12 |
| E3 | 88 | 67 | −18 |

TABLE 4-continued

| Compound | Iso-N*(° C.) | HTP(1/μm) | Wavelength shift(nm) |
|---|---|---|---|
| E4 | 88 | 63 | −23 |
| E5 | 88 | 68 | −21 |
| E6 | 87 | 58 | −9 |
| E7 | 89 | 71 | −19 |
| E8 | 89 | 70 | −17 |
| E9 | 88 | 69 | −20 |
| E10 | 90 | 64 | −26 |
| E11 | 90 | 67 | −27 |
| E12 | 90 | 67 | −27 |
| E13 | 87 | 58 | −15 |
| E14 | 89 | 59 | −26 |
| E15 | 89 | 62 | −27 |
| E16 | 88 | 74 | −15 |
| E17 | 88 | 76 | −9 |
| CB15 | 74 | 7.9 | +193 |
| S811 | 73 | 10.1 | +7 |
| CN | 82 | 5.2 | +34 |
| HPBNP | 85 | 73 | +20 |

Note)
Iso-N* shows a phase transition temperature in a transition from an isotropic phase to a chiral nematic phase.

Example 19

Each of liquid crystal compositions containing the optically active compounds (E1 to E3) were prepared in the same manner as in Example 18 except that the nematic liquid crystal (ZLI-1565) supplied by Merck & Co., Inc. was replaced with a nematic liquid crystal ZLI-4718 supplied by Merck & Co., Inc., and the thus-prepared liquid crystal compositions were similarly measured for upper-limit temperatures of their N* phases, HTPs and wavelength shifts. As a refractive index n, there was employed a value of 1.6 that ZLI-4718 as a base liquid crystal had. Table 5 shows the results. When ZLI-4718 was used, large HTPs and minus wavelength shifts were observed as well.

TABLE 5

| Compound | Iso-N*(° C.) | HTP(1/μm) | Wavelength shift(nm) |
|---|---|---|---|
| E1 | 93 | 75 | −20 |
| E2 | 92 | 77 | −20 |
| E3 | 93 | 72 | −33 |

Note)
Iso-N* shows a phase transition temperature in a transition from an isotropic phase to a chiral nematic phase.

What is claimed is:

1. An optically active compound of the general formula (1),

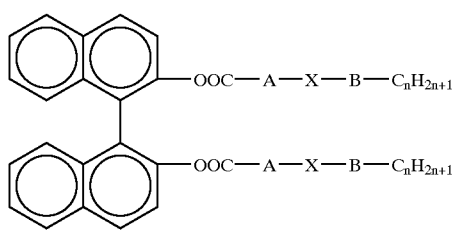

(1)

wherein n is an integer of 1 to 10, A is —Ph—, —Ph(F)—, —Ph—Ph— or —Np—, X is —OOC— or —OCH$_2$—, B is one of the groups defined in the following (1) to (4), (1) when A is —Ph— or —Ph(F)— and when X is —OOC—, B is —Ph—Ph—Y—, —Cy—Ph—Y—, —Ph—Cy—, —Cy—Cy—, —Ph—Di—, —Np—Y—, —Py(R)—Ph—Y—, —Ph—Py(L)—Y—, —Ph—OOC—Ph—Y— or —Ph—OOC—Cy—, (2) when A is —Ph— or —Ph(F)— and when X is —OCH$_2$—, B is —Ph—Ph—Y—, —Ph—Cy—, —Ph—Di—, —Np—Y—, —Py(R)—Ph—Y— or —Ph—Py(L)—Y—, (3) when A is —Ph—Ph— or —Np— and when X is —OOC—, B is —Ph—Y— or —Cy—, and (4) when A is —Ph—Ph— or —Np— and when X is —OCH$_2$—, B is —Ph—Y—, in which —Ph—, —Ph(F)—, —Cy—, —Di—, —Py(L)—, —Py(R)— and —Np— show the following structures, and Y is a single bond or an oxygen atom,

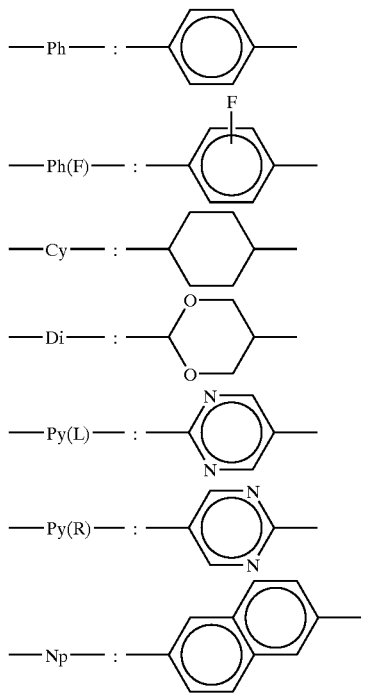

2. The optically active compound of claim 1, which has the general formula (1) in which A is —Ph— or —Ph—Ph—.

3. The optically active compound of claim 1, which has the general formula (1) in which X is —OOC—.

4. The optically active compound of claim 1, which has the general formula (1) in which A is —Ph— or —Ph—Ph— and X is —OOC—.

5. The optically active compound of claim 1, which has the general formula (1) in which n is an integer of 3 to 8.

6. The optically active compound of claim 1, which has the general formula (1) in which A is —Ph—, X is —OOC— and B is —Ph—Cy— or —Ph—Ph—.

7. The optically active compound of claim 1, which has the general formula (1) in which A is —Ph—Ph—, X is —OOC— and B is —Ph— or —Cy—.

8. The optically active compound of claim 1, which has a helical twisting power (HTP) of 50 or more.

9. The optically active compound of claim 1, which induces a helical pitch and has a property that the induced helical pitch decreases in length with an increase in temperature.

10. A chiral dopant of the general formula (1) in claim 1.

11. A nematic liquid crystal composition containing at least one compound from the optically active compound of the general formula (1) in claim 1.

12. A liquid crystal display device having the nematic liquid crystal composition recited in claim 11 interposed between substrates having an electrode each.

* * * * *